3,138,188
RETAINER RING ADAPTED TO BE SNAPPED THROUGH THE WORKPIECE APERTURE
Michael R. Tuozzo, Prospect Park, and Samuel J. Mundell, Jr., Glenolden, Pa., assignors to South Chester Corporation, Lester, Pa., a corporation of Delaware
Filed Sept. 28, 1961, Ser. No. 141,383
1 Claim. (Cl. 151—69)

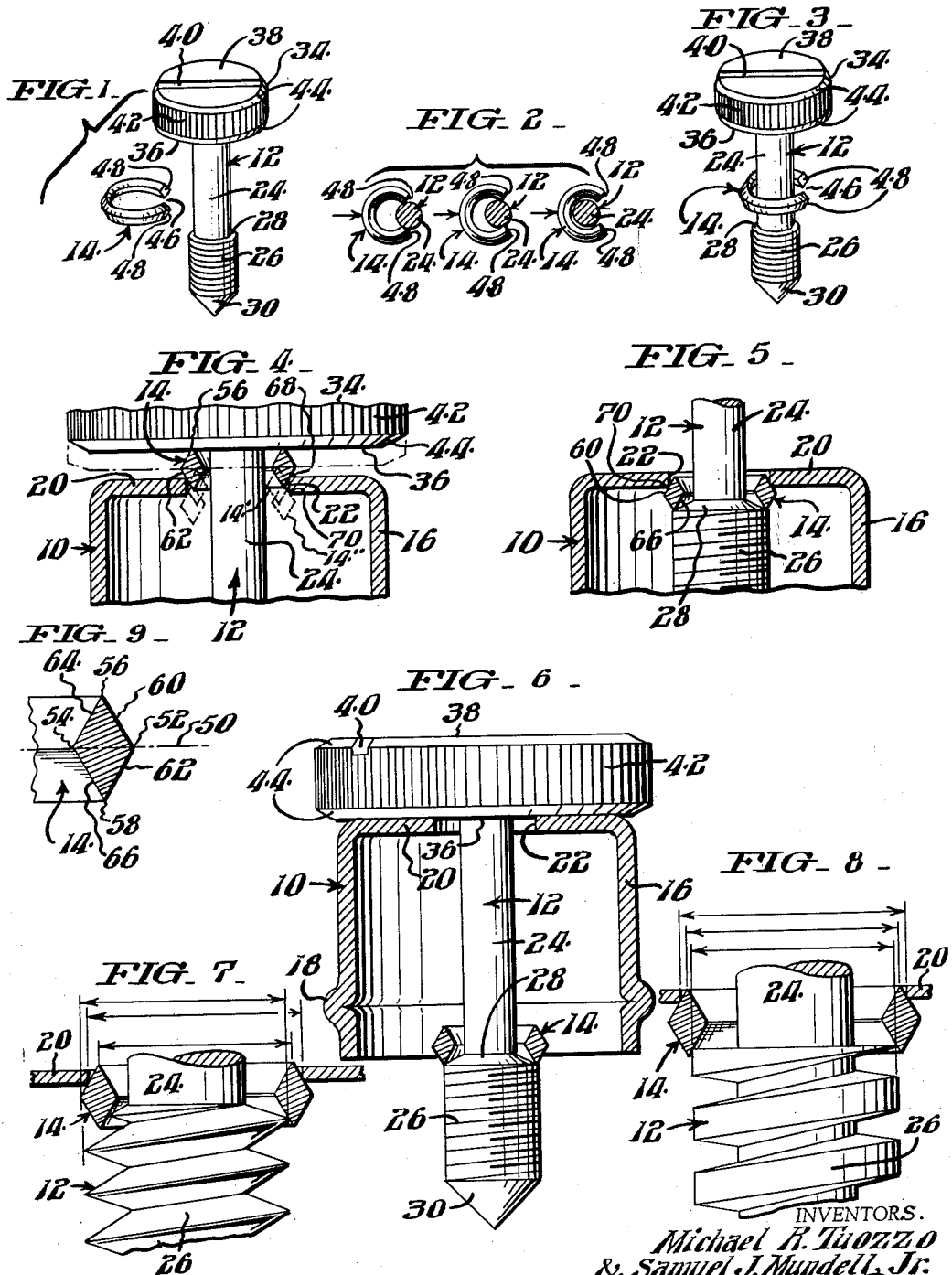

This invention relates generally to fastening devices and particularly to captive screw fasteners.

A principal object of the invention is to provide a screw with a retainer ring which may be assembled therewith by being snapped over the shank of the screw.

Another object is to provide such a screw and retainer ring combination conveniently assembled with a workpiece by being snapped thereinto, whereupon the retainer ring, coacting with the work-piece, holds the screw captive.

Other objects of the invention will become apparent when the following description is read with reference to the accompanying drawing, in which:

FIG. 1 is an exploded perspective view showing the screw and retainer ring;

FIG. 2 is a series of views indicating how the screw and retainer ring are assembled;

FIG. 3 is a perspective view showing the screw and the retainer ring snapped over the shank of the screw;

FIG. 4 is a fragmentary longitudinal section showing the fastener in the process of being applied to the workpiece;

FIG. 5 is a fragmentary longitudinal section showing the retainer ring coacting with the work-piece to hold the screw captive;

FIG. 6 is a longitudinal section showing the fastener fully assembled with the work-piece;

FIG. 7 is an enlarged view similar to FIG. 5, but shows in detail one type of thread formed on the upset end portion of the screws;

FIG. 8 is an enlarged view similar to FIG. 5, but shows in detail another type of thread formed on the upset end portion of the screw; and FIG. 9 is an enlarged section through one side of the retainer ring.

Referring to the drawings, the unit constructed in accordance with the invention comprises a standoff device in the form of an inverted cup-like member, generally designated 10, a screw, generally designated 12, projected through the member 10, an a retainer ring, generally designated 14, adapted for coacting with the standoff member or work-piece 10 for holding the screw 12 captive.

The standoff member 10 includes a cylindrical wall 16 provided with a circumferentially extending bead 18. The lower end of the standoff member is open while the upper end is provided with a transversely extending wall 20 centrally apertured, as at 22.

The screw 12 is provided with a shank 24 terminating at its lower end in a threaded upset end portion 26. At the juncture of the shank 24 and the upset 26 is an axially tapered shoulder 28. The lower extremity of the upset 26 is axially tapered, as at 30. At the upper end portion of the shank is a head 34 having a flat undersurface 36, a flat top surface 38, a screw driver slot 40, a knurled periphery 42, and beveled circumferentially extending edges 44.

The retainer ring 14 is made of resilient hard metal or non-metal stock quadrilateral in transverse section and is provided with a bight 46 defined by opposed square-cut ends 48. Extending about the outer and inner peripheries of the retainer ring, in the median plane 50 thereof, are edges respectively designated 52 and 54. Extending about the top and bottom of the retainer ring respectively are edges respectively designated 56 and 58. The outer periphery of the retainer ring is provided with a circumferentially extending axially tapered upper surface 60 between the edges 52 and 56 and a circumferentially extending axially tapered lower surface 62 between the edges 52 and 58. The inner periphery of the retainer ring is provided with a circumferentially extending axially tapered upper surface 64 between between the edges 54 and 56 and a circumferentially extending axially tapered lower surface 66 between the edges 54 and 58.

The following structural relationships should be noted: The outside diameter of the upset 26 is slightly less than the diameter of aperture 22. The bight 46 is slightly less than the diameter of the shank 24. The outside diameter of the retainer ring 14 is greater than the diameter of the aperture 22. The retainer ring 14 has an inside diameter and a bight such that the retainer ring may be contracted to a size which permits passage of the retainer ring through aperture 22.

In addition, referring particularly to FIG. 7, it should be noted that the mean diameter of the retainer ring may be slightly smaller than the outside diameter of upset 26 when V threads are provided on upset 26, and, referring particularly to FIG. 8, that the mean diameter of the retainer ring must be slightly greater than the outside diameter of upset 26 when square threads are provided on upset 26.

The stock out of which the retainer ring is fashioned preferably is of diamond shape in transverse section, and preferably, but not necessarily, the shorter diagonal of the diamond shape is in the median plane 50 of the retainer ring and the longer diagonal of the diamond shape is parallel to the central axis of the retainer ring. If desired, the stock may be square in transverse section, with one diagonal of the square in the median plane and the other parallel to the central axis of the retainer ring. The term "diamond shape" is used broadly to include such square stock.

Referring particularly to FIGS. 1, 2, and 3, the retainer ring 14 is applied to the shank 24 of the screw 12 by snapping it thereover, as shown. Then the upset end 26 of the screw is projected freely through the aperture 22, with the terminal portion 30 leading. The retainer ring 14 drops to and is seated upon the wall 20 with its surface 62 engaging the upper edge of aperture 22, designated 68, as shown by full lines in FIG. 4. The undersurface 36 of the screw head 34 is seated upon the retainer ring, in contact with the edge 56 thereof.

Then the retainer ring 14 is forced through the aperture 22 by hand pressure applied to the top of the screw head 34. When pressure is applied, the retainer ring is cammed radially inwardly. The surface 62 moves downwardly over the edge 68 of aperture 22, and as it does so, the retainer ring is contracted radially, as shown by broken lines at 14' in FIG. 4. Simultaneously, the edge 56 of the retainer ring slides over the undersurface 36 of the screw head 34. When further pressure is applied, the retainer ring moves through the aperture 22 with its edge 52 in contact with the axially extending cylindrical wall thereof until the edge 52 is just below the undersurface of the wall 20, whereupon the retainer ring, under the influence of its inherent resilience, expands and continues to move in the same direction away from the screw head 34 with its surface 60 in contact with the lower edge of the aperture 22, designated 70. When the retainer ring has re-expanded, it is in the position shown by broken lines at 14'' in FIG. 4. After re-expanding, the ring drops along the shank 24 to the shoulder 28, as shown in FIG. 6.

When it is attempted to separate the screw from the standoff member, as shown in FIG. 5, the outer edge of shoulder 28 engages surface 66 of the retainer ring, forcing the retainer ring against the underside of the wall 20 with the edge 70 of the aperture 22 engaging the surface 60 of the retainer ring. FIG. 7 illustrates this condition when the upset 26 is provided with V threads, while FIG. 8 illustrates this condition when the upset 26 is provided with square threads. As the effort to pull the screw through aperture 22 is increased, the outer edge of shoulder 28 tends to move over surface 66 and cam retainer ring 14 radially outwardly and expand the same. Simultaneously, surface 60 tends to move upwardly in contact with edge 70 of aperture 22. Thus there is a tendency for the retainer ring 14 to be cammed radially inwardly by the edge 70 of aperture 22 to contract the retainer ring 14. As a result, the ring can neither expand nor contract, and the screw is effectively held captive in the standoff member by coaction of the retainer ring 14 with the wall 20.

It will be understood, of course, that the present invention, as described and shown, is susceptible to various changes and modifications which may be made without any departure from the general principles or real spirit of the invention. Accordingly, it is intended to claim the present invention broadly, as well as specifically, as indicated in the appended claim.

Having thus described our invention, we claim as follows:

The combination comprising a workpiece having an apertured area, a screw extending freely through said aperture including a shank having a smooth portion and a threaded upset end portion, a head on the screw on the end of the shank opposite said threaded portion, said smooth shank portion being of constant diameter and extending between said head and said threaded portion, and a radially outwardly extending shoulder about said screw at the juncture of said upset end portion and shank, and a resilient split retainer ring embracing said smooth shank portion and freely shiftable axially thereof, said ring being made of resilient stock of diamond shape in transverse section, and being arranged with all four surface areas sloping axially, the axial thickness of said ring being slightly greater than twice the axial thickness of said workpiece at the edge of said aperture, and the outside diameter of said ring in its normal expanded position being slightly greater than the diameter of said aperture, the diameter of said aperture being greater than the diameter of said threaded portion and being at least equal to the diameter of said shank smooth portion plus twice the maximum radial dimension of a cross section of the ring, the junction of the two surface areas at each axial end of the ring being located substantially at the radial midpoint of the ring cross section, the normal expanded diameter of the ring at said radial midpoint being greater than the diameter of said threaded portion and less than the diameter of said aperture.

References Cited in the file of this patent
UNITED STATES PATENTS

| | | |
|---|---|---|
| 1,649,525 | Herold | Nov. 15, 1927 |
| 1,970,078 | Dillon | Aug. 14, 1934 |
| 2,460,613 | Whelan | Feb. 1, 1949 |
| 2,478,508 | Simpson | Aug. 9, 1949 |